United States Patent
Chung et al.

(10) Patent No.: US 10,827,240 B2
(45) Date of Patent: Nov. 3, 2020

(54) COOPERATIAVE DYNAMIC BANDWIDTH ALLOCATION METHOD IN MOBILE NETWORK WITH OPTICAL NETWORK, AND DEVICE OF PERFORMING THE COOPERATIAVE DYNAMIC BANDWIDTH ALLOCATION METHOD

(71) Applicant: ELECTRONICS AND TELECOMMUNICATIONS RESEARCH INSTITUTE, Daejeon (KR)

(72) Inventors: Hwan Seok Chung, Daejeon (KR); Kyeong Hwan Doo, Daejeon (KR); Han Hyub Lee, Daejeon (KR); Kwang Ok Kim, Jeonju-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/503,766

(22) Filed: Jul. 5, 2019

(65) Prior Publication Data
US 2020/0014992 A1    Jan. 9, 2020

(30) Foreign Application Priority Data

Jul. 6, 2018 (KR) .................. 10-2018-0078570
Jul. 5, 2019 (KR) .................. 10-2019-0081007

(51) Int. Cl.
*H04B 10/00* (2013.01)
*H04Q 11/00* (2006.01)
*H04J 14/08* (2006.01)
*H04J 14/00* (2006.01)

(52) U.S. Cl.
CPC .......... *H04Q 11/0067* (2013.01); *H04J 14/08* (2013.01); *H04Q 2011/0064* (2013.01); *H04Q 2011/0086* (2013.01)

(58) Field of Classification Search
CPC .................. H04J 14/08; H04J 14/086; H04Q 2011/0064; H04Q 11/0067
See application file for complete search history.

(56) References Cited

U.S. PATENT DOCUMENTS

| 8,213,800 B1 | 7/2012 | Liu et al. |
| 2015/0208347 A1* | 7/2015 | Iiyama .................. H04L 12/12 370/311 |
| 2016/0277142 A1 | 9/2016 | Doo et al. |
| 2017/0013618 A1 | 1/2017 | Shin |
| 2018/0103466 A1 | 4/2018 | Andreoli-Fang |

FOREIGN PATENT DOCUMENTS

JP    2011-146780 A    7/2011

* cited by examiner

*Primary Examiner* — Daniel G Dobson
(74) *Attorney, Agent, or Firm* — LRK Patent Law Firm

(57) ABSTRACT

A cooperative dynamic bandwidth allocation (CO-DBA) method in a structure in which a mobile network and an optical access network are combined allows the mobile network and the optical access network to share mobile scheduling information in advance and allocate bandwidths in advance, and thus prevent a latency in upstream transmission of mobile traffic.

15 Claims, 10 Drawing Sheets

COOPERATIAVE DYNAMIC BANDWIDTH ALLOCATION METHOD IN MOBILE NETWORK WITH OPTICAL NETWORK, AND DEVICE OF PERFORMING THE COOPERATIAVE DYNAMIC BANDWIDTH ALLOCATION METHOD

CROSS-REFERENCE TO RELATED APPLICATIONS

This application claims priority to Korean Patent Application Nos. 10-2018-0078570, filed Jul. 6, 2018, and 10-2019-0081007, filed Jul. 5, 2019, the entire content of which is hereby incorporated by reference.

BACKGROUND OF THE INVENTION

1. Field of the Invention

One or more example embodiments relate to a cooperative dynamic bandwidth allocation method to be applied to a structure in which an optical access network and a mobile network are combined, and a device performing the cooperative dynamic bandwidth allocation method, and more particularly, to a cooperative dynamic bandwidth allocation method and device that transmits mobile traffic with low latency when a passive optical network (PON) accommodates a mobile network.

2. Description of Related Art

A mobile network may use a separate base station including a central unit (CU) (or station equipment) that is configured to process a digital signal and manage transmission and reception of data, and at least one radio unit (RU) (or child equipment) configured to process a digital signal. The CU and the RU may be linked through a cable, for example, an optical cable.

Between the station equipment and the child equipment included in the separated base station, an optical access network including an optical line terminal (OLT) and an optical network unit (ONU), which are optical access equipment, may connect them. When the mobile network is connected to the optical access network, a low-latency data transmission method may be needed to receive an augmented and virtual reality service.

SUMMARY OF THE INVENTION

An aspect of the present disclosure provides a method and device that may transmit data with low latency by allowing a separated base station of a mobile network and a time division multiplexing (TDM)-based optical access network to share bandwidth allocation information to enable low-latency data transmission in a structure in which the optical access network and the separated base station of the mobile network are combined.

According to an example embodiment, there is provided a cooperative dynamic bandwidth allocation (CO-DBA) method to be performed by a central unit (CU) and/or a digital unit (DU), the CO-DBA method including receiving, from an optical line terminal (OLT) through an optical network unit (ONU), a bandwidth allocation request for a second time-slot made by at least one piece of user equipment (UE) connected to a remote unit (RU), in a first time-slot, determining mobile scheduling in response to the bandwidth allocation request, and transmitting, to the OLT, bandwidth allocation information for the second time-slot in response to a result of determining the mobile scheduling. The second time-slot may be a future time-slot subsequent to the first time-slot.

The CO-DBA method may further include signaling, to each RU, cooperative bandwidth allocation in the first time-slot.

The OLT may transmit, to the ONU, the bandwidth allocation information for the second time-slot during the first time-slot.

The ONU may transmit, to the at least one piece of UE connected to the RU, the bandwidth allocation information for the second time-slot.

The at least one piece of UE connected to the RU may transmit, to the ONU through the RU, mobile traffic of the first time-slot during the first time-slot, and transmit, to the ONU through the RU, the bandwidth allocation request for the second time-slot during the first time-slot.

The at least one piece of UE connected to the RU may transmit, to the ONU through the RU, mobile traffic of the second time-slot during the second time-slot, and transmit, to the ONU through the RU, a bandwidth allocation request for a third time-slot which is a future time-slot subsequent to the second time-slot, during the second time-slot.

The OLT may generate a bandwidth map to match the bandwidth allocation information for the second time-slot received from the CU and/or DU, in the first time-slot.

According to another example embodiment, there is provided a CO-DBA method to be performed by an OLT, the CO-DBA method including receiving, from an ONU, a bandwidth allocation request for a second time-slot made by at least one piece of UE connected to an RU, in a first time-slot, transmitting, to a CU and/or DU, the bandwidth allocation request for the second time-slot made by the at least one piece of UE, receiving, from the CU and/or DU, bandwidth allocation information for the second time-slot based on mobile scheduling determined by the CU and/or DU, and transmitting, to the ONU, the bandwidth allocation information for the second time-slot during the first time-slot. The second time-slot may be a future time-slot subsequent to the first time-slot.

The CU and/or DU may signal, to each RU, cooperative bandwidth allocation in the first time-slot.

The ONU may transmit, to the at least one piece of UE connected to the RU, the bandwidth allocation information for the second time-slot.

The at least one piece of UE connected to the RU may transmit, to the ONU through the RU, mobile traffic of the first time-slot, during the first time-slot, and transmit, to the ONU through the RU, the bandwidth allocation request for the second times-lot, during the first time-slot.

The at least one piece of UE connected to the RU may transmit, to the ONU through the RU, mobile traffic of the second time-slot, during the second time-slot, and transmit, to the ONU through the RU, a bandwidth allocation request for a third time-slot which is a future time-slot subsequent to the second time-slot, during the second time-slot.

The OLT may generate a bandwidth map to match the bandwidth allocation information for the second time-slot received from the CU and/or DU, in the first time-slot.

According to still another example embodiment, there is provided a CO-DBA method to be performed by a piece of UE, the CO-DBA method including transmitting, to an ONU through an RU, mobile traffic of a first time-slot and a bandwidth allocation request for a second time-slot, in the first time-slot, receiving, from the ONU, bandwidth allocation information for the second time-slot, in the first time-slot, and transmitting, to the ONU through the RU, mobile traffic of the second time-slot and a bandwidth allocation request for a third time-slot, in the second time-slot. The second time-slot may be a future time-slot subsequent to the first time-slot, and the third time-slot may be a future time-slot subsequent to the second time-slot.

The ONU may transmit, to an OLT, the bandwidth allocation information for the second time-slot. The OLT may transmit, to the ONU, the bandwidth allocation information for the second time-slot received from a CU and/or DU, during the first time-slot.

The OLT may transmit, to the ONU, the bandwidth allocation information for the second time-slot, during the first time-slot.

The OLT may generate a bandwidth map to match the bandwidth allocation information for the second time-slot received from the CU and/or DU, in the first time-slot.

Advantageous Effects

According an example embodiment, it is possible to transmit data with low latency by allowing a separated base station of a mobile network and a time division multiplexing (TDM)-based optical access network to share bandwidth allocation information in a structure in which the separated base station of the mobile network and the optical access network are combined.

DETAILED DESCRIPTION OF THE INVENTION

Hereinafter, example embodiments of the present disclosure will be described in detail with reference to the accompanying drawings.

Figure 1:
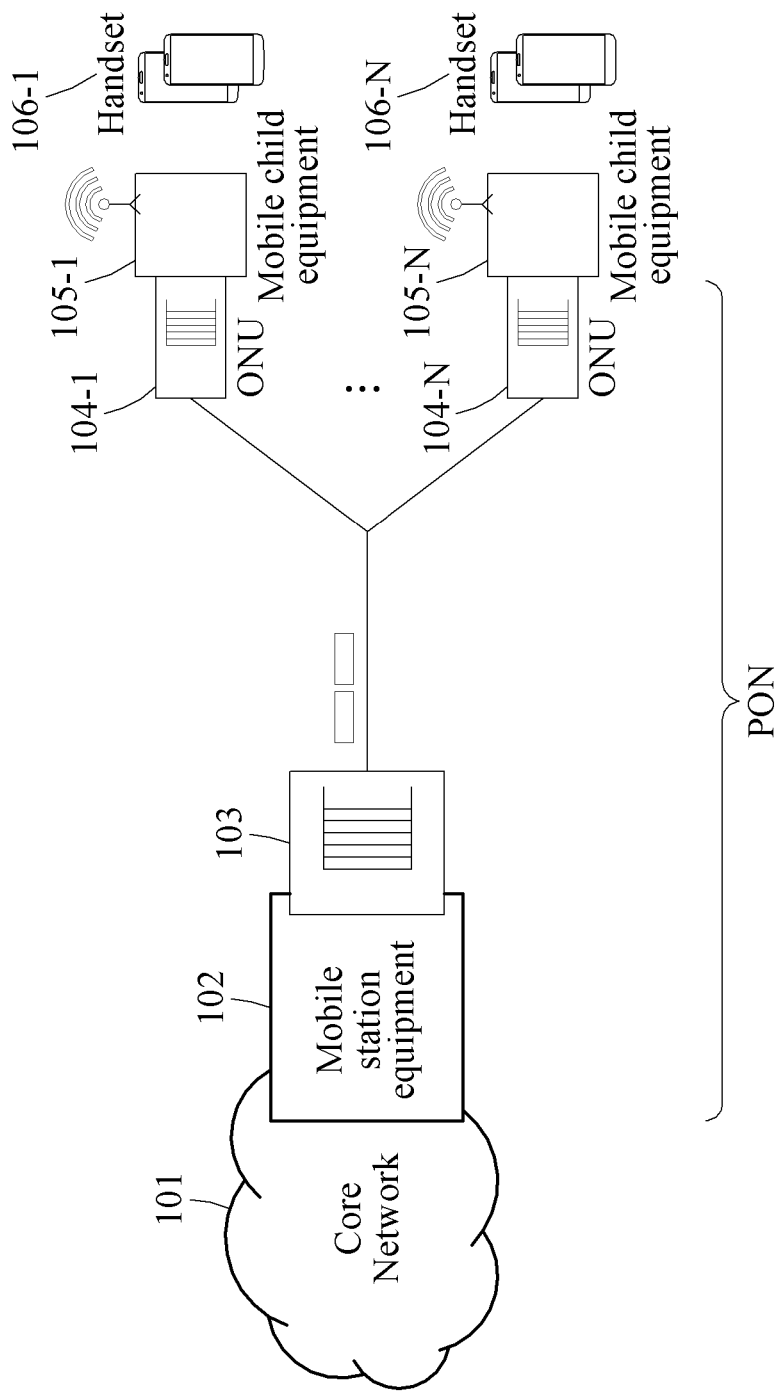
FIG. 1 is a diagram illustrating an example of a mobile network connected to a time division multiplexing-passive optical network (TDM-PON) according to an example embodiment.

FIG. 1 is a diagram illustrating an example of a mobile network connected to a time division multiplexing-passive optical network (TDM-PON) according to an example embodiment.

In the example of FIG. 1, a mobile network and an optical access network are connected. The mobile network is connected to a core network 101. The mobile network supports a separated base station, and the separated base station consists of mobile station equipment (pieces of mobile station equipment 102-1 through 102-N) and mobile child equipment (pieces of mobile child equipment 104-1 through 104-N).

Based on a type of separated base station, components to be included in the mobile station equipment 102-1 through 102-N and the mobile child equipment 104-1 through 104-N may vary. For example, the mobile station equipment 102-1 through 102-N may be a central unit (CU) or a digital unit (DU), and the mobile child equipment 104-1 through 104-N may be a remote unit (RU). For another example, the mobile station equipment 102-1 through 102-N may be a CU, and the mobile child equipment 104-1 through 104-N may be a DU and an RU.

In addition, the optical access network consists of an optical line terminal (OLT) 103, and a plurality of optical network units (ONUs) 104-1 through 104-N. Here, between the mobile station equipment 102-1 through 102-N and the mobile child equipment 104-1 through 104-N that are included in the separated base station, the OLT 103 and the ONUs 104-1 through 104-N that are equipment of the optical access network, for example, a passive optical network (PON), may be disposed. Each of RUs 105-1 through 105-N included in the mobile child equipment 104-1 through 104-N is connected to each user equipment (UE) (pieces of UE 106-1 through 106-N). The OLT 103 and the ONUs 104-1 through 104-N may transmit data through time division multiplexing (TDM). In detail, the TDM may indicate a type of data transmission by which a plurality of optical devices shares a single wavelength temporally to transmit data.

The TDM-PON which is the optical access network may need to reduce an amount of time required to transmit data upstream or downstream in order to accommodate an ultra-low latency augmented and virtual reality service. For example, to provide a multimedia-based augmented service including, for example, an ultra-high definition (UHD) three-dimensional (3D) hologram, an ultra-low latency transmission method that transmits data in a short period of time may be needed.

Thus, a cooperative dynamic bandwidth allocation (CO-DBA) method may be applied such that the mobile network connected to the TDM-PON which is the optical access network transmits data with low latency. According to an example embodiment, there is provided a method of transmitting data with low latency when an optical access network is present in a mobile network. In detail, there is provided a CO-DBA based method of transmitting data by a TDM-PON with low latency when the optical access network, such as the TDM-PON, and the mobile network are connected.

In detail, there is provided a method of transmitting data with low latency by allowing a separated base station included in a mobile network and an optical network to share bandwidth allocation information when the optical access network accommodates the separated base station used in the mobile network. Hereinafter, detailed operations of such CO-DBA method will be described.

Figure 2:
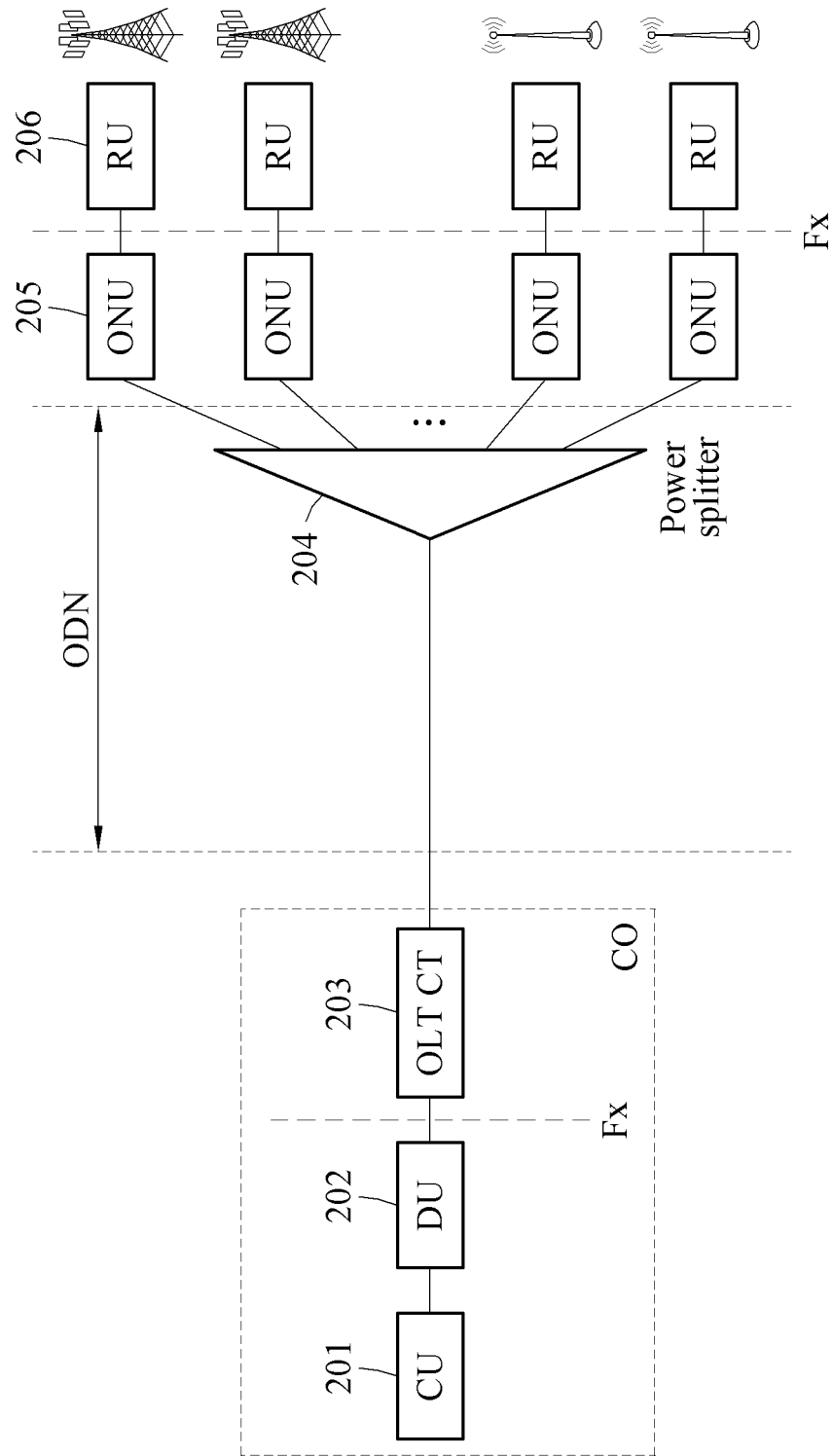
FIG. 2 is a diagram illustrating an example of a TDM-PON structure in relation to a mobile network according to an example embodiment.

FIG. 2 is a diagram illustrating an example of a TDM-PON structure in relation to a mobile network according to an example embodiment.

In the example of FIG. 2, a TDM-PON structure is for a fifth generation (5G) fronthaul network. The 5G fronthaul network is of a low layer split structure. Referring to FIG. 2, mobile station equipment includes a CU 201 and a DU 202, and mobile child equipment includes an RU 206.

For a fronthaul interface, a TDM-PON supporting a data rate of 10 gigabyte per second (Gb/s) or greater may need to satisfy a bandwidth and a latency requirement. According to an example embodiment, CO-DBA may be applied to the TDM-PON to satisfy the bandwidth and the latency requirement. Referring to FIG. 2, the TDM-PON includes an OLT 203, a power splitter 204 corresponding to an optical distribution network (ODN), and a plurality of ONUs 205.

When the TDM-PON is used for 5G fronthaul transmission as illustrated in FIG. 2, a downstream latency time may be relatively low, but an upstream latency time may be several milliseconds (ms). This is because, an OLT grants an upstream transmission of each ONU to prevent an upstream data collision. To use the TDM-PON for low-latency fronthaul transmission, it may need to reduce the upstream latency time. To this end, scheduling information in a mobile network may be shared with the OLT 203 which is one of components included in the TDM-PON, an optical access network.

Figure 3:
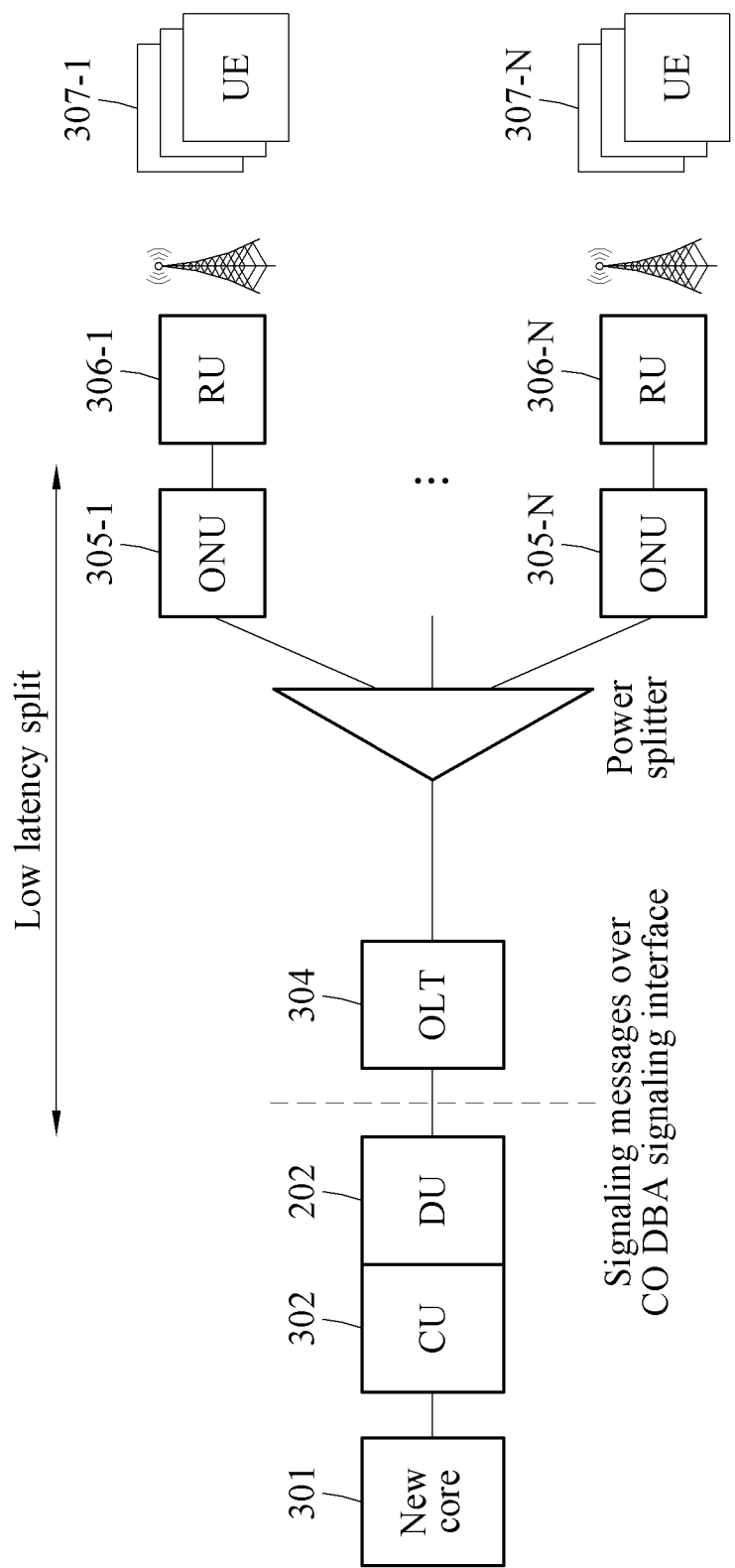
FIG. 3 is a diagram illustrating an example of a cooperative dynamic bandwidth allocation (CO-DBA) signaling interface for mobile fronthaul according to an example embodiment.

FIG. 3 is a diagram illustrating an example of a CO-DBA signaling interface for mobile fronthaul according to an example embodiment.

Referring to FIG. 3, a core network 301 is connected to a CU 302 and a DU 303 included in mobile station equipment of a mobile network. The CU 302 and the DU 303 may exchange a message with an OLT 304 of a TDM-PON which is an optical access network. Here, a CO-DBA signaling interface may be formed between the CU 302 and the DU 303, and the OLT 304. Through the CO-DBA signaling interface, various sets of information for CO-DBA may be shared with the OLT 304. In addition, ONUs 305-1 through 305-N of the optical access network are connected to RUs 306-1 through 306-N which are mobile child equipment of the mobile network. The RUs 306-1 through 306-N are connected to pieces of UE 307-1 through 307-N.

Figure 4:
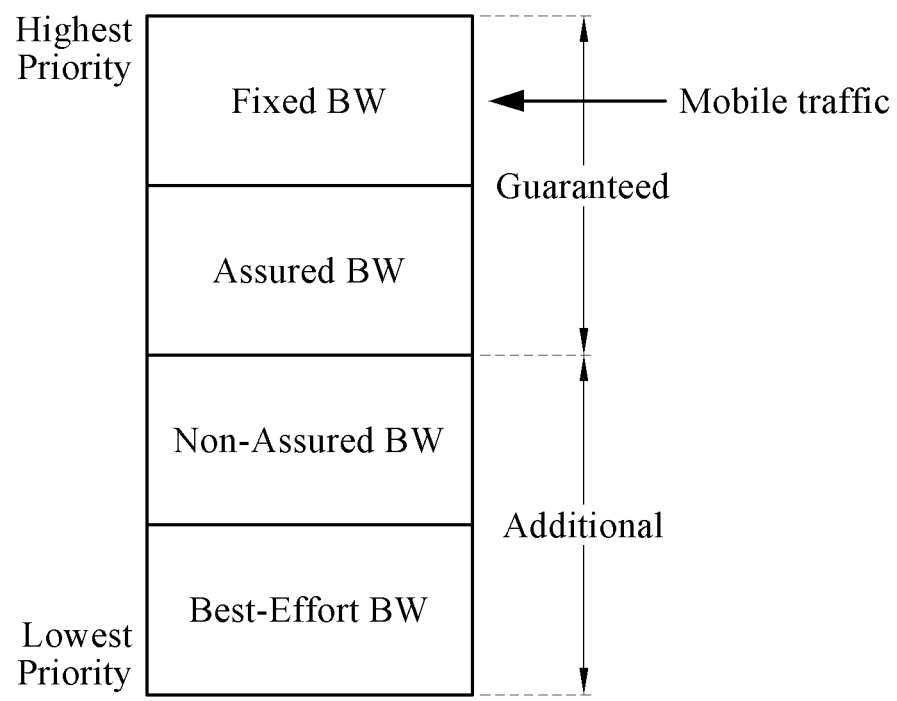
FIG. 4 is a diagram illustrating an example of low-latency scheduling according to an example embodiment.

In the example of FIG. 3, low-latency transmission may need to be performed in the TDM-PON which is the optical access network. As illustrated in FIG. 4, when a highest priority is applied to mobile traffic, a bandwidth of a region receiving data downstream may need to be divided by a peak rate. Then, a portion in the bandwidth that is not used may not be reallocated to other nodes or services.

When existing dynamic bandwidth allocation (DBA) is applied to the TDM-PON, the OLT 304 may transmit bandwidth allocation information to each of the ONUs 305-1 through 305-N, and each of the ONUs 305-1 through 305-N may transmit, to the OLT 304, upstream data only in an allowable time-slot. The existing DBA may consider dynamic upstream traffic and a configured traffic contract. This is a responsive method of monitoring upstream traffic, by which each of the ONUs 305-1 through 305-N is based on a buffer state report.

As a result, upstream data to be transmitted from the RUs 306-1 through 306-N may wait in the ONUs 305-1 through 305-N until band allocation is completed. This is because, in the existing DBA, optical equipment and mobile equipment do not exchange any information between them.

However, according to an example embodiment, when the CO-DBA is applied, a mobile scheduler of the CU 302 or the DU 303 and a PON scheduler of the OLT 304 may exchange information. As illustrated in FIG. 3, the UE 307-1 through 307-N sends, to the CU 302 or the DU 303, a request for a bandwidth required for upstream transmission.

Subsequently, the CU 302 or the DU 303 transmits a result of determining bandwidth allocation to the UE 307-1 through 307-N, and signals to the OLT 304 about information associated with the result of determining the bandwidth allocation. Such signaling may allow the OLT 304 to determine bandwidth allocation for the upstream transmission in advance for the ONUs 305-1 through 305-N. The OLT 304 applies the bandwidth allocation to a time around an arrival time of mobile traffic to be transmitted through the upstream transmission.

When the CO-DBA is applied, it is possible to save an amount of time used in the existing DBA to detect presence of mobile traffic through buffer feedback of the ONUs 305-1 through 305-N. Thus, such application of the CO-DBA may enable low-latency upstream transmission in the optical access network.

FIG. 4 is a diagram illustrating an example of low-latency scheduling according to an example embodiment.

In the example of FIG. 4, low-latency scheduling in which service classes are differentiated for 5G fronthaul transmission is performed.

Referring to FIG. 4, priorities are allocated to mobile traffic in an upstream direction, with service classes differentiated. For example, the service classes consist of a fixed bandwidth, an assured bandwidth, a non-assured bandwidth, and a best-effort bandwidth, based on the priorities.

The fixed bandwidth has a highest priority, and the best-effort bandwidth has a lowest priority. The fixed bandwidth having the highest priority is assigned with an upstream bandwidth on a periodic basis irrespective of a requirement. The assured bandwidth may be similar to the fixed bandwidth, but is not be assigned with an upstream bandwidth without a request. Thus, mobile traffic generated from a DU or an RU may be connected to a fixed bandwidth class, and thus a bandwidth may be guaranteed. The mobile traffic may thus be transmitted upstream with low latency.

For example, when mobile traffic is connected to a fixed bandwidth class with the highest priority and is then transmitted, CO-DBA may be applied such that such transmission is supported in an optical access network. That is, the low-latency transmission of mobile traffic may be supported also in the optical access network, by allowing scheduling information in a mobile network to be shared with an OLT of the optical access network and allowing the OLT to allocate a bandwidth to an ONU in advance based on the scheduling information.

Figure 5:
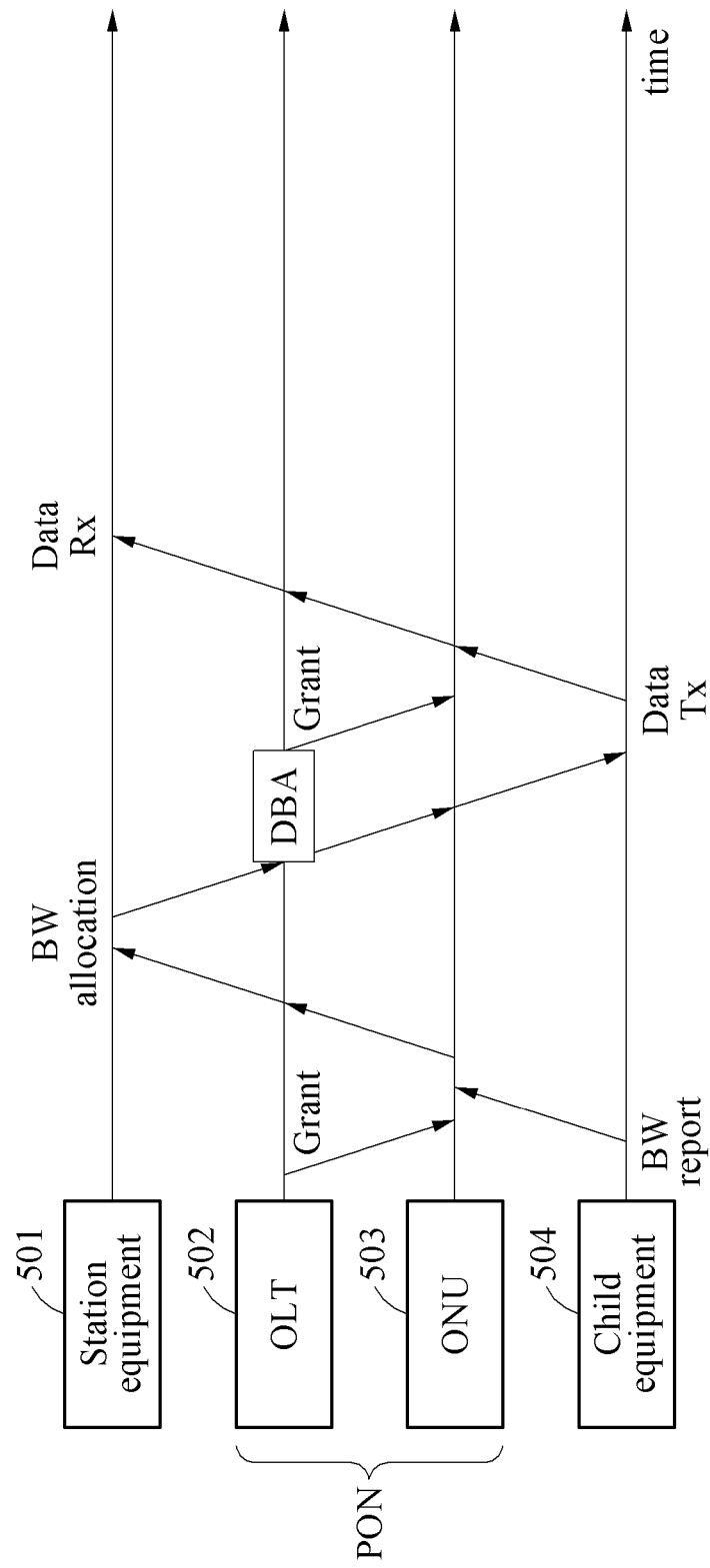
FIG. 5 is a diagram illustrating an example of information exchange for CO-DBA in a structure in which a separate base station and a passive optical network (PON) are connected according to an example embodiment.

FIG. 5 is a diagram illustrating an example of information exchange for CO-DBA in a structure in which a separate base station and a PON are connected according to an example embodiment.

Referring to FIG. 5, a bandwidth request process and a bandwidth allocation process may be needed to transmit data of child equipment 504 of a mobile network to station equipment 501 through an ONU 503 and an OLT 502 which are included in a TDM-PON, an optical access network. In a structure in which the TDM-PON, and the mobile network to which a separate base station is applied are combined, a transmission time of mobile traffic that needs low-latency transmission may be reduced in the optical access network.

According to an example, CO-DBA is applied as follows.

When the separated base station is connected to a passive optical access network such as the TDM-PON, and the child equipment 504 has data to be transmitted to the station equipment 501 in a current time-slot, the child equipment 504 reports bandwidth information to the ONU 503. The child equipment 504 requests, in advance in the current time-slot, a bandwidth required to transmit data upstream in a next time-slot. That is, the ONU 503 receives, from the child equipment 504 in the current time-slot, the bandwidth information required for the upstream transmission in the next time-slot.

Before the ONU 503 receives the bandwidth information from the child equipment 504, the ONU 503 transmits bandwidth information for the upstream transmission to the OLT 502 and the station equipment 501. Subsequently, the station equipment 501 transmits available bandwidth information that is usable by the child equipment 504 to the child equipment 504 downstream through the OLT 502 and the ONU 503. Here, the OLT 502 allocates in advance a bandwidth for data transmission in the next time-slot, and transmits grant information to the ONU 503.

Thus, when the child equipment 504 transmits mobile traffic upstream in the next time-slot, a packet of the mobile traffic may not stay long in the ONU 503 because the bandwidth for the upstream transmission is granted in advance to the ONU 503. That is, the ONU 503 transmits the mobile traffic upstream to the station equipment 501 immediately through the OLT 502 using the bandwidth for the next time-slot that is allocated in advance in the current time-slot.

That is, when the CO-DBA is applied, information associated with bandwidth allocation may be exchanged between the station equipment 501 and the child equipment 504 which are included in the separated base station, and the OLT 502 and the ONU 503 which are included in the passive optical access network. Thus, a bandwidth required for upstream transmission may be allocated in advance to an ONU, and thus an amount of time required for the data transmission may be reduced greatly. Thus, it is possible to transmit mobile traffic with low latency also in the optical access network.

Figure 6:
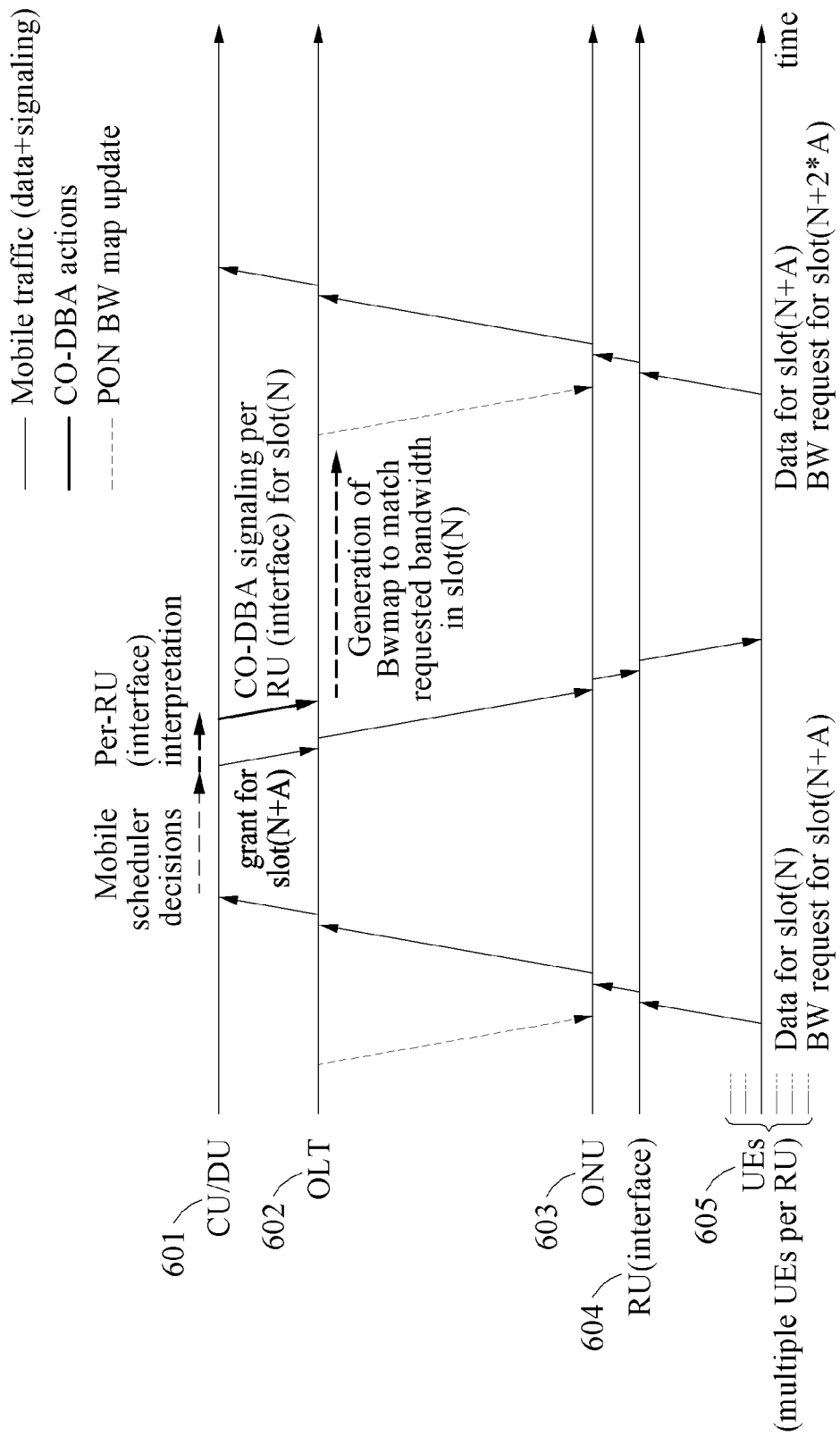
FIG. 6 is a diagram illustrating an example of CO-DBA in a structure in which a separated base station and a PON are connected according to an example embodiment.

FIG. 6 is a diagram illustrating an example of CO-DBA in a structure in which a separated base station and a PON are connected according to an example embodiment.

Referring to FIG. 6, a CU and/or DU 601 and an OLT 602 are connected by a logical CO-DBA signaling interface. The CU/DU 601 and the OLT 602 may share a same physical interface by data traffic.

The CU/DU 601 determines how much traffic is required for a given time interval and a given service. In addition, the CU/DU 601 determines a maximum upstream latency required for the determined traffic. The CU/DU 601 reports a signaling message to the OLT 602. Here, an RU 604 may be connected to a PON through an ONU 603.

The CU/DU 601 adds a report for each identifier (ID) to identify a service and an RU interface. To follow a diversity of predicted bandwidths of the RU 604, the CU/DU 601 updates information associated with the report for each ID.

The OLT 602 accepts and parses signaling messages using an ID to link a report to a corresponding transmission container (T-CONT). The OLT 602 adopts PON band allocation based on reports in the signaling messages.

Based on such rules described above, operations may be performed as illustrated in FIG. 6. FIG. 6 illustrates time-based CO-DBA in a situation in which an optical access network and a mobile network are connected.

(1) In a current time-slot N, pieces of UE 605 transmit data upstream to an RU 604, and request an air (or wireless) interface capacity for a future time-slot N+A. The air interface capacity may include a bandwidth for upstream transmission in the future time-slot N+A.

The CU/DU 601 performs a scheduling decision, and notifies each of the pieces of UE 605 of an air interface resource allocated to each of the pieces of UE 605 for the future time-slot N+A. In parallel, the CU/DU 601 performs per-RU interface interpretation to infer a fronthaul traffic load for each RU 604 based on scheduling allocation to the pieces of UE 605.

The CU/DU 601 notifies the OLT 602 of a traffic load per RU for the future time-slot N+A. The CU/DU 601 notifies the OLT 602 of the traffic load per RU using signaling messages including a traffic ID for the traffic load per RU.

The OLT 602 adopts DBA for the future time-slot N+A for a T-CONT corresponding to the traffic ID.

The CU/DU 601 performs CO-DBA signaling for each RU 605 for the current time-slot N. The OLT 602 then generates a bandwidth map to match a bandwidth requested in the current time-slot N. Here, the OLT 602 applies, to the bandwidth map, a bandwidth required for upstream transmission in the future time-slot N+A, and updates the bandwidth map. The OLT 602 provides the updated bandwidth map to the ONU 603.

(2) In the future time-slot N+A, the pieces of UE 605 transmit uplink traffic. The transmission of the uplink traffic may be processed in the RU 604, and the uplink traffic may be transmitted as a fronthaul packet through the PON. In the future time-slot N+A, the pieces of UE 605 send, to the CU/DU 601, a request for an air interface capacity for a future time-slot N+2A. The air interface capacity may include a bandwidth for upstream transmission in the future time-slot N+2A.

A repetition rate of CO-DBA interaction between the UE 605 and the CU/DU 601 may correspond to each time-slot, for example, once every slot. The repetition rate of the CO-DBA interaction between the UE 605 and the CU/DU 601 may depend on a diversity of traffic having a maximum value of each time-slot. The RU 604 may refer to a logical interface connected to a user-network interface (UNI) in the ONU 603. In actual implementation, there may be a plurality of RU interfaces integrated into a physical RU device.

Figure 7:
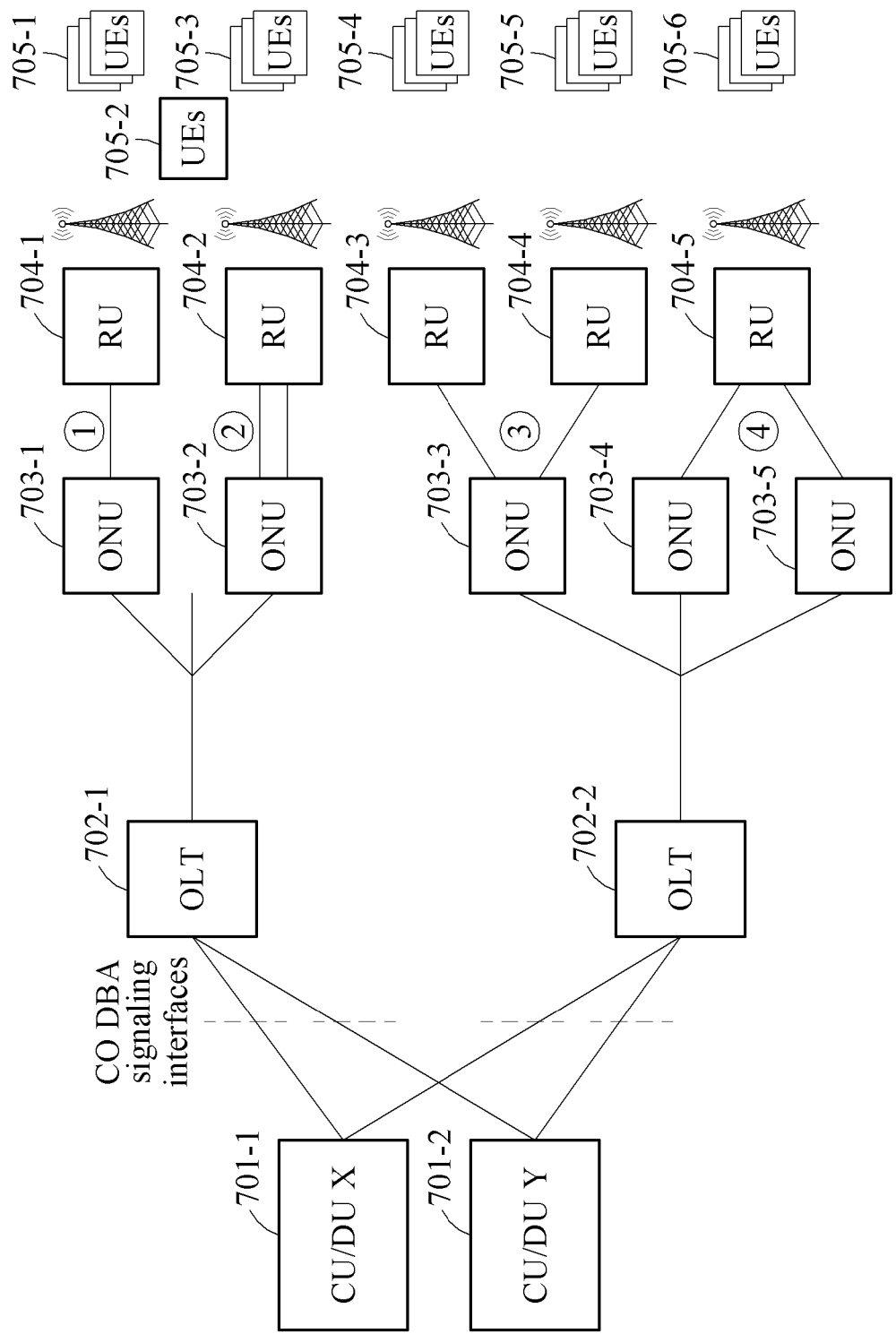
FIG. 7 is a diagram illustrating an example of a diversity of structures to which CO-DBA is applicable according to an example embodiment.

FIG. 7 is a diagram illustrating an example of a diversity of structures to which CO-DBA is applicable according to an example embodiment.

FIG. 7 illustrates a structure to which CO-DBA is applied for mobile fronthaul. There may be various basic cases of connection between UNIs of ONUs 703-1 through 703-5 and RU interfaces, and may thus be various modifications.

Referring to FIG. 7, each of OLTs 702-1 and 702-2 is connected to CU/DUs 701-1 and 701-2, and interacts with them.

Each of the CU/DUs 701-1 and 701-2 may have a plurality of RUs through a plurality of PONs for the plurality of the OLTs 702-1 and 702-2. Thus, each of the CU/DUs 701-1 and 701-2 may be connected to the OLTs 702-1 and 702-2.

Each PON may provide a mixture of RUs present in different CU/DUs.

Each RU may pertain (or be present) to only one of the CU/DUs 701-1 and 701-2.

Each RU may have a plurality of interfaces, each of which may be connected to an ONU UNI. In the example of FIG. 7, there are four types of connection between an ONU UNI and an RU.

Additionally, CO-DBA may support a mixture of different low-latency services having different latency requirements, in a same PON. The CO-DBA may also support a mixture of services not requiring low-latency and services requiring low-latency, in a same PON.

Figure 8:
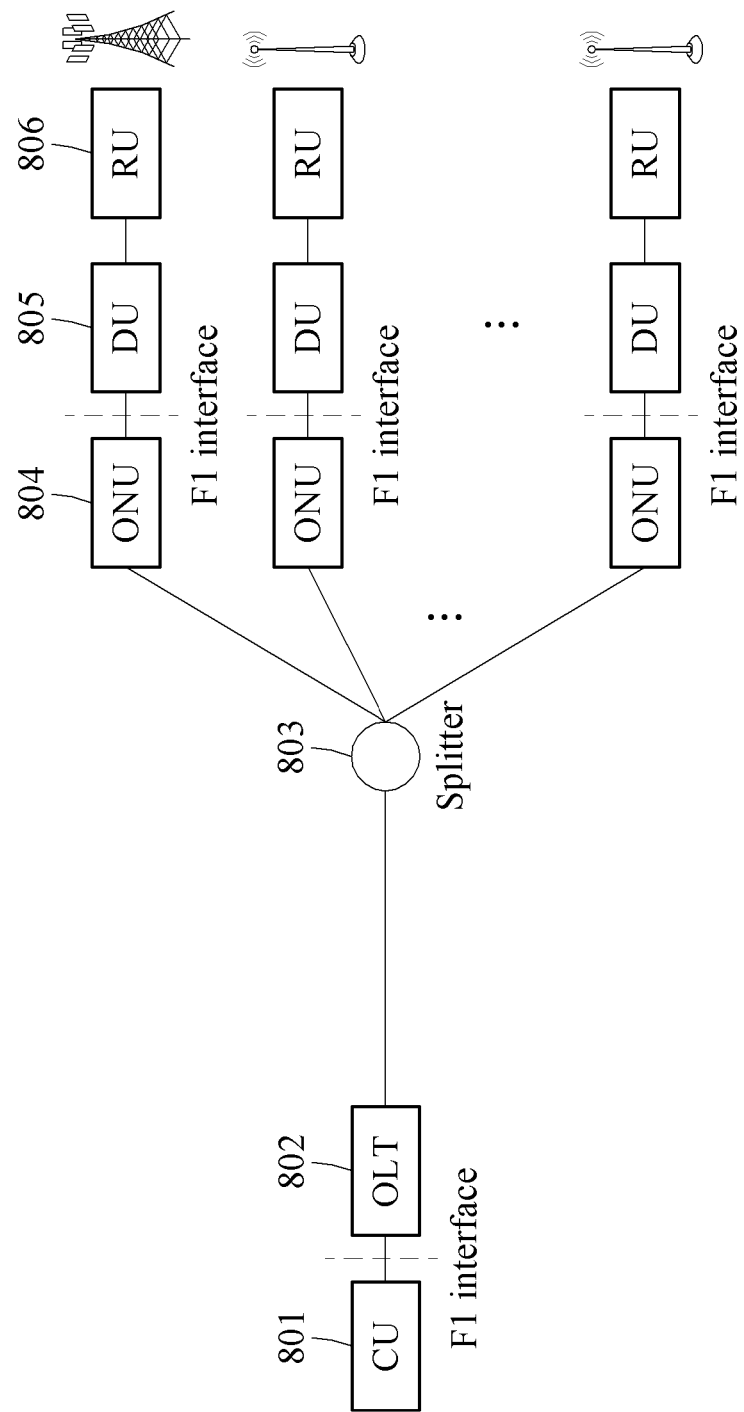
FIG. 8 is a diagram illustrating another example of a TDM-PON structure in relation to a mobile network according to an example embodiment.

FIG. 8 is a diagram illustrating another example of a TDM-PON structure in relation to a mobile network according to an example embodiment.

FIG. 8 illustrates a TDM-PON structure for a 5G fronthaul network. The 5G fronthaul network illustrated in FIG. 8 is of a high layer split structure which is different from the low layer split structure illustrated in FIG. 2. Referring to FIG. 8, mobile station equipment includes a CU 801, and mobile child equipment includes a DU 805 and an RU 806. The CU 801 and an OLT 802 are directly connected through an F1 interface, and the DU 805 and the RU 806 are connected to an ONU 804 through the F1 interface.

Although the structure illustrated in FIG. 8 is different from the structure illustrated in FIG. 2, the CO-DBA described above with reference to FIGS. 3 through 7 may be applied to the structures identically.

Figure 9:
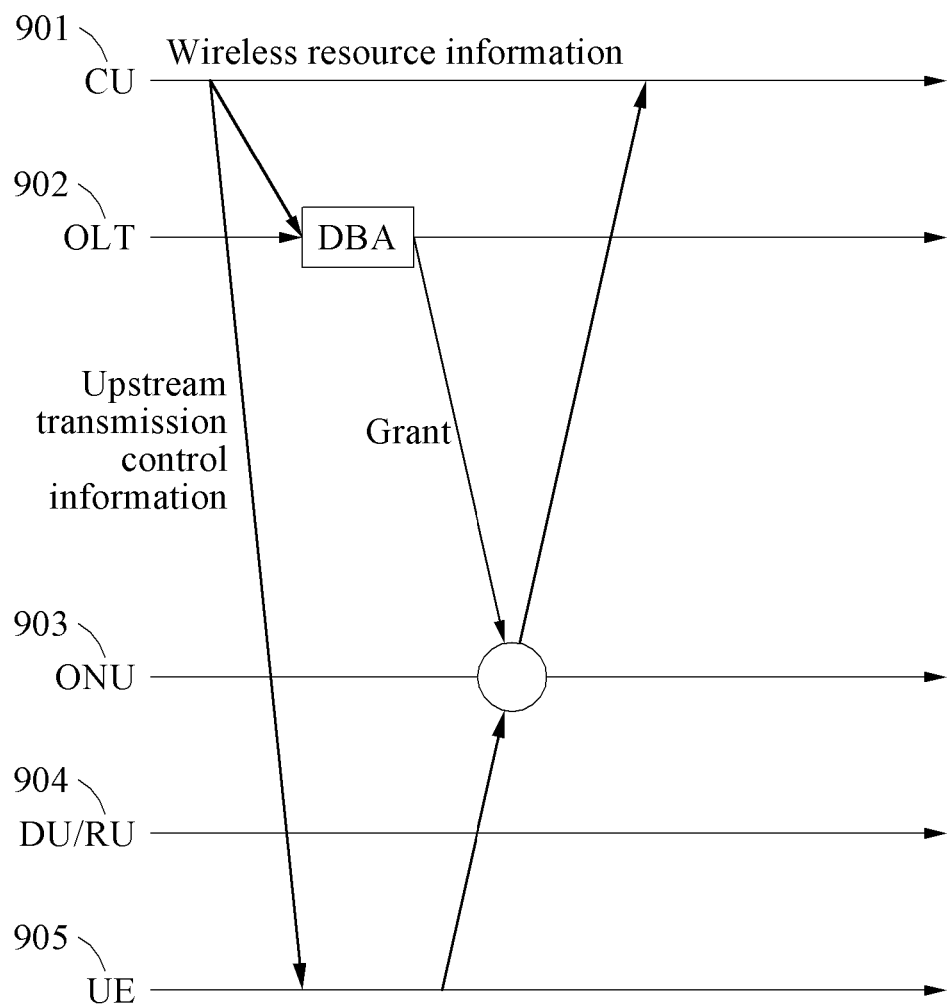
FIG. 9 is a diagram illustrating an example of information exchange for CO-DBA in view of user equipment (UE) in a structure in which a separate base station and a PON are connected according to an example embodiment.

FIG. 9 is a diagram illustrating an example of information exchange for CO-DBA in view of UE in a structure in which a separate base station and a PON are connected according to an example embodiment.

Referring to FIG. 9, mobile station equipment which is a CU 901 may transmit, to an OLT 902, a bandwidth allocation signal which is wireless resource information through downstream data. That is, bandwidth-related scheduling information between the mobile station equipment and a DU and/or RU 904 which is mobile child equipment may also be shared with the OLT 902.

The OLT 902 may then allocate in advance an upstream bandwidth to an ONU 903 through DBA. That is, in a current time-slot N, the OLT 902 may allocate in advance a bandwidth to be used by the ONU 903 for upstream transmission in a future time-slot N+A, and grant the allocated bandwidth to the ONU 903.

Subsequently, mobile traffic to be transmitted by UE 905 to the CU 901 in the future time-slot N+A may be transmitted to the ONU 903 through the DU/RU 904. Here, since the bandwidth for the future time-slot N+A is allocated in advance by the OLT 902 and granted to the ONU 903, the ONU 903 may immediately transmit the mobile traffic to the OLT 902 without waiting. Thus, a delay or latency in upstream transmission that may occur due to a waiting time may be reduced, and thus low-latency upstream transmission of mobile traffic may be enabled in an optical access network connected to a mobile network.

Figure 10:
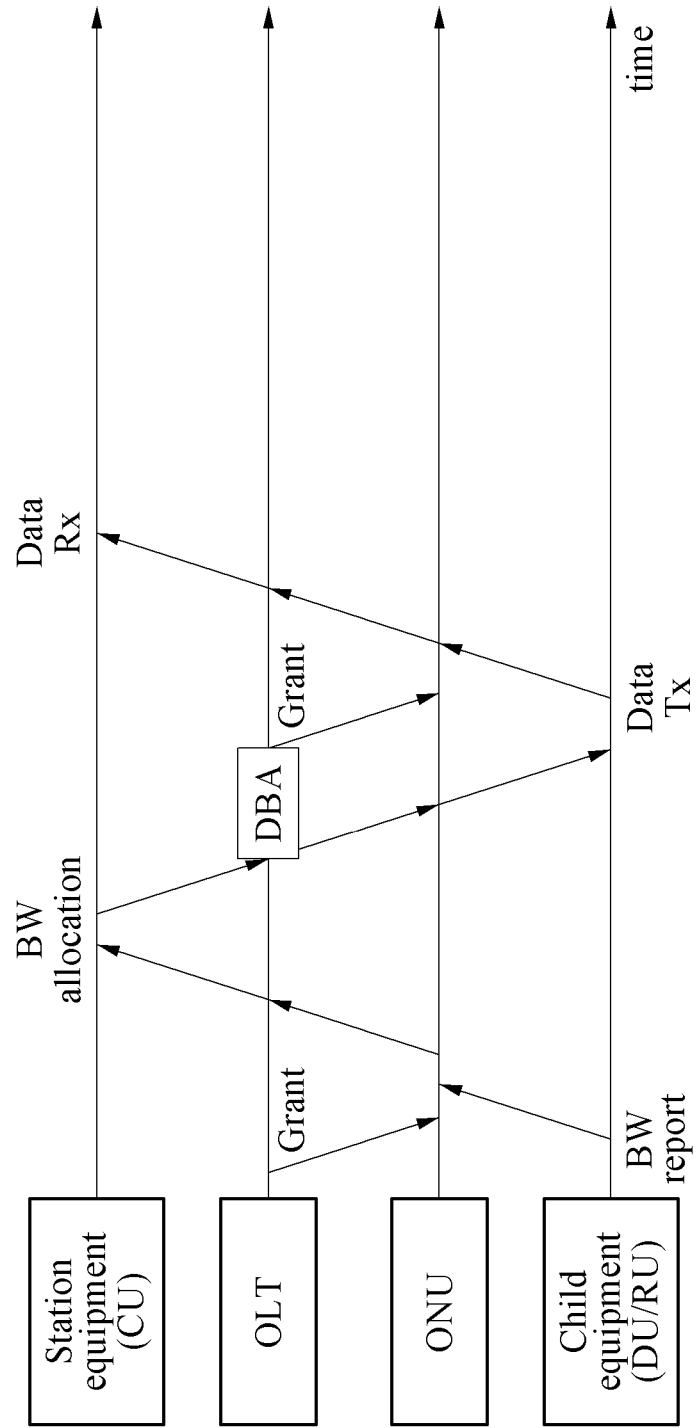
FIG. 10 is a diagram illustrating an example of information exchange for CO-DBA in a structure in which a separate base station and a PON are connected according to an example embodiment.

FIG. 10 is a diagram illustrating an example of information exchange for CO-DBA in a structure in which a separate base station and a PON are connected according to an example embodiment.

A CO-DBA method will be described with reference to FIG. 10. When scheduling information for transmission of mobile traffic by mobile station equipment such as a CU is shared with an OLT, the OLT may allocate an upstream bandwidth to an ONU based on the scheduling information without waiting for a bandwidth allocation request from the ONU.

To this end, the ONU may receive bandwidth report information, for example, a BW report, from mobile child equipment including, for example, a DU and/or a RU, to transmit the mobile traffic upstream as a packet.

Before receiving such data packet from the child equipment, the ONU may transmit a bandwidth allocation request to the OLT and the station equipment. The station equipment may then transmit, to the OLT, a bandwidth allocated to the child equipment during the downstream. The OLT may then perform DBA based on the scheduling information including, for example, the bandwidth allocated to the child equipment, which is received from the station equipment.

The OLT may perform the DBA based on the scheduling information shared by a mobile network. The OLT may then determine a bandwidth required for upstream transmission in a future time-slot through the DBA, and allocate in advance the bandwidth to the ONU in a current time-slot. Thus, the ONU may not need to wait until a bandwidth required for upstream transmission of mobile traffic is allocated in the future time-slot. That is, the ONU may use the bandwidth already allocated by the OLT in the current time-slot to immediately transmit mobile traffic upstream in the future time-slot, and thus low-latency transmission of mobile traffic may be enabled also in an optical access network.

Between the station equipment and the child equipment which are included in a separate base station, the OLT and the ONU which are optical access equipment may be connected. According to an example embodiment, there is provided CO-DBA that, when a TDM-PON is combined with a mobile network, may allocate a bandwidth to an ONU for upstream transmission in a future time-slot by allowing bandwidth allocation information to be shared by the mobile network for low latency. The CO-DBA may enable broadband transmission through which multimedia-based augmented reality and virtual reality services such as, for example, UHD and 3D hologram, are provided, and ultra-low latency transmission through which data is transmitted in a short period of time.

The methods according to the above-described example embodiments may be recorded in non-transitory computer-readable media including program instructions to implement various operations of the above-described. Examples of the non-transitory computer readable media include magnetic media, optical media, digital media, and the like.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

In addition, the computer-readable media may be any available media that are accessible by a computer, and all computer storage media and transmission media.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein. Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. The features of the examples described herein may be combined in various ways as will be apparent after an understanding of the disclosure of this application. Further, although the examples described herein have a variety of configurations, other configurations are possible as will be apparent after an understanding of the disclosure of this application.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Therefore, the scope of the disclosure is defined not by the detailed description, but by the claims and their equivalents, and all variations within the scope of the claims and their equivalents are to be construed as being included in the disclosure.

What is claimed is:

1. A cooperative dynamic bandwidth allocation method to be performed by a central unit (CU) and/or a digital unit (DU), comprising:
   receiving, from a user equipment (UE) through an optical line terminal (OLT), a bandwidth allocation request related to air interface capacity for a second future time-slot N+A transmitted by the UE in a first time-slot N, wherein the N and A being natural numbers;
   performing a schedule decision; and
   notifying the allocation of a bandwidth related to the air interface capacity for the second future time-slot N+A to the UE,
   wherein the second future time-slot N+A is a future time-slot coming A slots later than the first time-slot N,
   wherein a data for the first time-slot N and the bandwidth allocation request related to air interface capacity for the second future time-slot N+A are transmitted from the UE to a remote unit (RU) during the first time-slot N.

2. The cooperative dynamic bandwidth allocation method of claim 1, further comprising:
   signaling, to each RU, cooperative bandwidth allocation for the second future time-slot N+A.

3. The cooperative dynamic bandwidth allocation method of claim 1, further comprising:
   performing infer a fronthaul traffic load for each RU based on scheduling allocation for the UE.

4. The cooperative dynamic bandwidth allocation method of claim 1, further comprising:
   notifying a traffic load per RU for the second future time-slot N+A to the OLT by a signaling message including a traffic ID for the traffic load.

5. The cooperative dynamic bandwidth allocation method of claim 1, wherein a data for the second future time-slot N+A and the bandwidth allocation request related to air interface capacity for a third future time-slot N+2A are transmitted from the UE to the RU during the second future time-slot N+A.

6. The cooperative dynamic bandwidth allocation method of claim 1, wherein
   a bandwidth map to match the bandwidth requested in the first time-slot N is generated by the OLT.

7. A cooperative dynamic bandwidth allocation method to be performed by an optical line terminal (OLT), comprising:
   transmitting, to a central unit (CU) and/or a digital unit (DU), a bandwidth allocation request related to air interface capacity for a second future time-slot N+A transmitted by a user equipment (UE) in a first time-slot N; and receiving, from the CU and/or DU, notification for the allocation of a bandwidth related to the air interface capacity for the second time-slot based on a schedule decision performed by the CU and/or DU, wherein the second future time-slot N+A is a future time-slot coming A slots later than the first time-slot, wherein a data for the first time-slot N and the bandwidth allocation request related to air interface capacity for the second future time-slot N+A are transmitted from the UE to a remote unit (RU) during the first time-slot N.

8. The cooperative dynamic bandwidth allocation method of claim 7, wherein
a cooperative bandwidth allocation for the second future time-slot N+A is signaled to the RU.

9. The cooperative dynamic bandwidth allocation method of claim 7, wherein a fronthaul traffic load for each RU is inferred based on scheduling allocation for the UE in the CU and/or the DU.

10. The cooperative dynamic bandwidth allocation method of claim 7, wherein a data for the second future time-slot N+A and the bandwidth allocation request related to air interface capacity for a third future time-slot N+2A are transmitted from the UE to the RU during the second future time-slot N+A.

11. The cooperative dynamic bandwidth allocation method of claim 1, wherein
a bandwidth map to match the bandwidth requested in the first time-slot N is generated by the OLT.

12. A cooperative dynamic bandwidth allocation method to be performed by a user equipment (UE), comprising:
transmitting, to an optical network unit (ONU) through a remote unit (RU), a bandwidth allocation request related to air interface capacity for a second future time-slot N+A in a first time-slot N, wherein the N and A being natural numbers; and receiving, from the ONU, notification for the allocation of a bandwidth related to the air interface capacity for the second future time-slot N+A, wherein the second future time-slot N+A is a future time-slot coming A slots later than the first time-slot N, wherein a data for the first time-slot N and the bandwidth allocation request related to air interface capacity for the second future time-slot N+A are transmitted from the UE to a remote unit (RU) during the first time-slot N.

13. The cooperative dynamic bandwidth allocation method of claim 12, wherein the allocation of a bandwidth related to the air interface capacity for the second future time-slot N+A is notified by a central unit (CU) and/or a digital unit (DU).

14. The cooperative dynamic bandwidth allocation method of claim 12, wherein a data for the second future time-slot N+A and the bandwidth allocation request related to air interface capacity for a third future time-slot N+2A are transmitted from the UE to the RU during the second future time-slot N+A.

15. The cooperative dynamic bandwidth allocation method of claim 12, wherein a bandwidth map to match the bandwidth requested in the first time-slot N is generated by the OLT.

* * * * *